Figure 1:
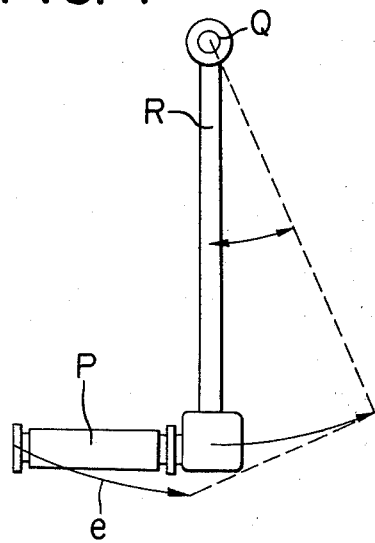

United States Patent [19]

Hayashi

[11] 3,989,134
[45] Nov. 2, 1976

[54] METHOD AND APPARATUS FOR TRANSFERRING ARTICLES

[76] Inventor: Torahiko Hayashi, 3-4, Nozawa, Utsunomiya, Tochigi, Japan

[22] Filed: Sept. 30, 1975

[21] Appl. No.: 618,059

[30] Foreign Application Priority Data
Sept. 30, 1974  Japan.............................. 49-112593

[52] U.S. Cl................................. 198/424; 198/436; 214/6 DK; 53/160
[51] Int. Cl.²...................................... B65G 47/26
[58] Field of Search............ 198/20 R, 27, 35, 31 R, 198/31 AA, 31 AB, 31 AC; 214/1 BD, 6 D, 6 DK; 53/160, 244

[56] References Cited
UNITED STATES PATENTS

| | | | |
|---|---|---|---|
| 3,444,982 | 5/1969 | Greiner | 198/20 R |
| 3,550,749 | 12/1970 | Story | 198/31 AB |
| 3,842,963 | 10/1974 | Kemper | 198/31 AC |

FOREIGN PATENTS OR APPLICATIONS

| | | | |
|---|---|---|---|
| 1,481,472 | 4/1969 | Germany | 214/6 DK |
| 1,005,370 | 9/1965 | United Kingdom | 214/6 DK |

Primary Examiner—Evon C. Blunk
Assistant Examiner—Joseph E. Valenza
Attorney, Agent, or Firm—Guy W. Shoup; Eliot S. Gerber

[57] ABSTRACT

Method and apparatus for transferring formed articles such as confectionery, bread or the like from a feed conveyor through a displaceable transfer conveyor onto a receiving conveyor, trays or boxes without tumbling, deforming or injuring the formed articles, the transfer conveyor being moved substantially downwardly at a velocity greater than the falling speed by gravity of the articles thereon, and then swung substantially laterally at a velocity sufficient to avoid contacts with the falling articles, and finally returned to its original position.

7 Claims, 8 Drawing Figures

METHOD AND APPARATUS FOR TRANSFERRING ARTICLES

The present invention relates to a method and an apparatus for transferring formed articles such as confectionery, bread or the like from a feed conveyor through a displaceable transfer conveyor onto a receiving conveyor, trays or boxes positioned beneath said transfer conveyor.

A prior transfer apparatus, disclosed in my application Ser. No. 518,210, filed Oct. 10, 1974, comprised a transfer conveyor swingable about a main shaft positioned thereabove, means for swinging said transfer conveyor about the main shaft in an abrupt manner, and a receiving conveyor, trays or boxes positioned beneath said transfer conveyor in a lateral direction, whereby the abrupt swinging motion of said transfer conveyor causes articles thereon to be transferred onto said receiving conveyor, trays or boxes.

However, the above apparatus leaves dissatisfaction to be improved in that in case articles are substantially sticky, the upper surface of the transfer conveyor and the bottom surfaces of the articles stick together due to a substantial friction, which shows a tendency to defore or injure the articles, whereby comercial value of finished articles would decrease.

An object of the present invention is to obviate the above-mentioned disadvantage and to provide a satisfactory method and apparatus for transferring the formed articles.

The above and other objects, features and advantages of the invention will be apparent in the undermentioned detailed description.

According to the present invention there is provided a method of continuously transferring formed articles such as confectionery, bread or the like from a feed conveyor through a displaceable transfer conveyor onto a receiving conveyor, trays or boxes positioned beneath said transfer conveyor, characterized by transferring articles by causing said transfer conveyor to move substantially downwardly at a velocity greater than the falling speed of gravity of the articles thereon, and the swing substantially laterally at a velocity sufficient to avoid contacts with the falling articles thereby to cause the articles to fall onto the receiving conveyor, trays or boxes, and finally return to its original position to receive subsequent articles from the feed conveyor.

Further, according to the present invention there is provided an apparatus for transferring formed articles such as confectionery, bread or the like from a feed conveyor onto a receiving conveyor, trays or boxes, comprising a displaceable transfer belt conveyor, which receives articles from the feed conveyor and transfers them to the receiving conveyor, trays or boxes, characterized by a first means for driving the belt of said transfers conveyor for reception and positioning of said articles thereonto, and a second means for causing said transfer conveyor to move substantially downwardly and then swing substantially laterally with a changeable radius of rotation about a fixed axis parallel to the direction of movement of the belt of said transfer conveyor and positioned thereabove, and finally return to its original position.

Figure 2:
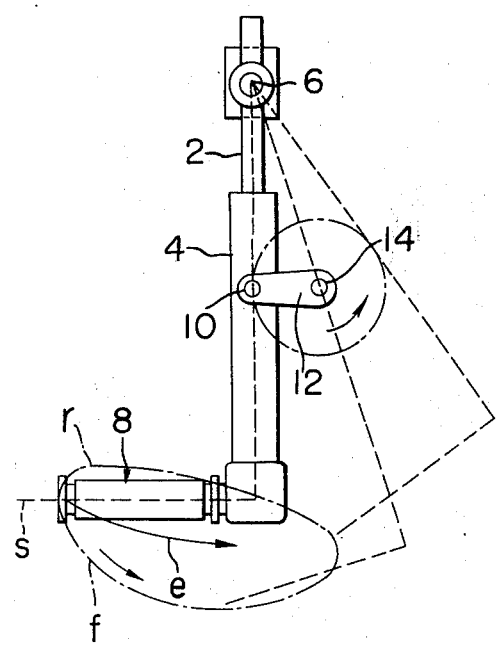
Figure 3:
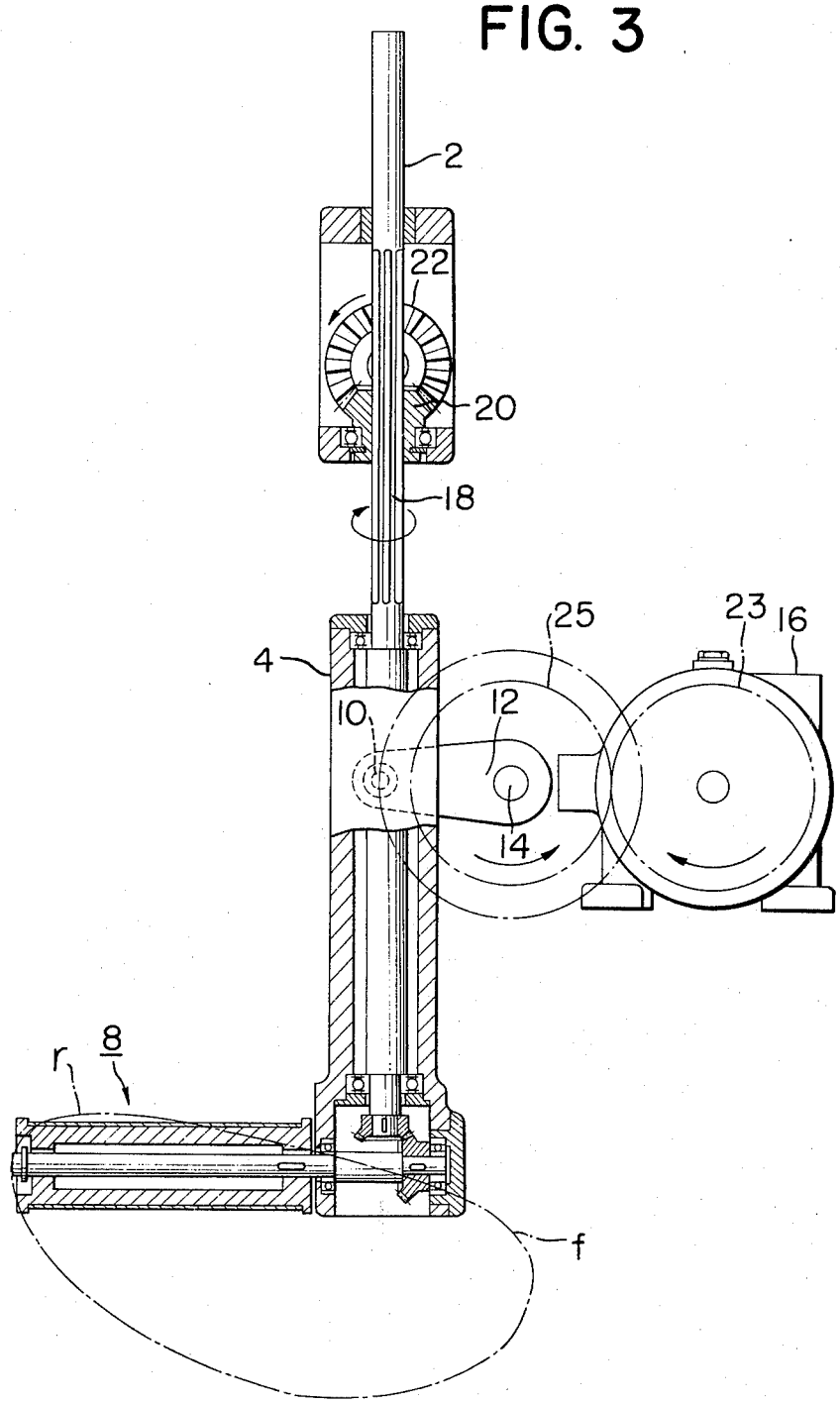
Figure 4:
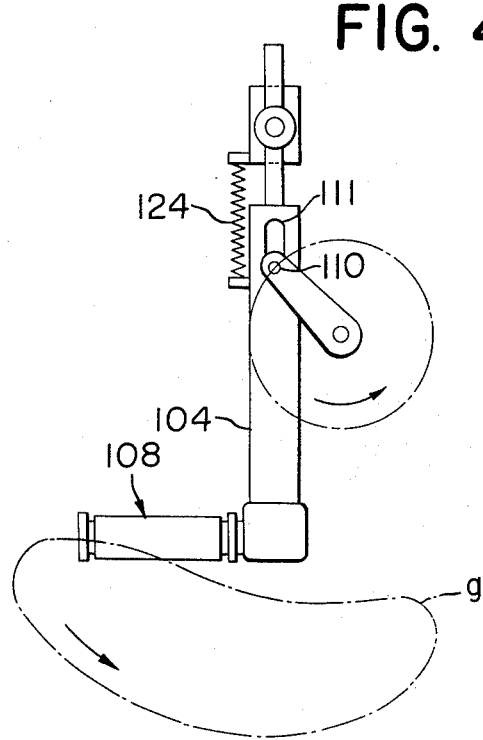
Figure 5:
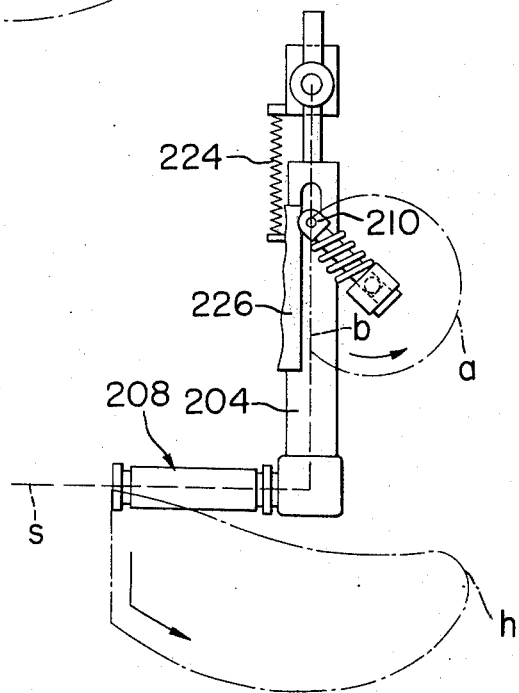
Figure 6:
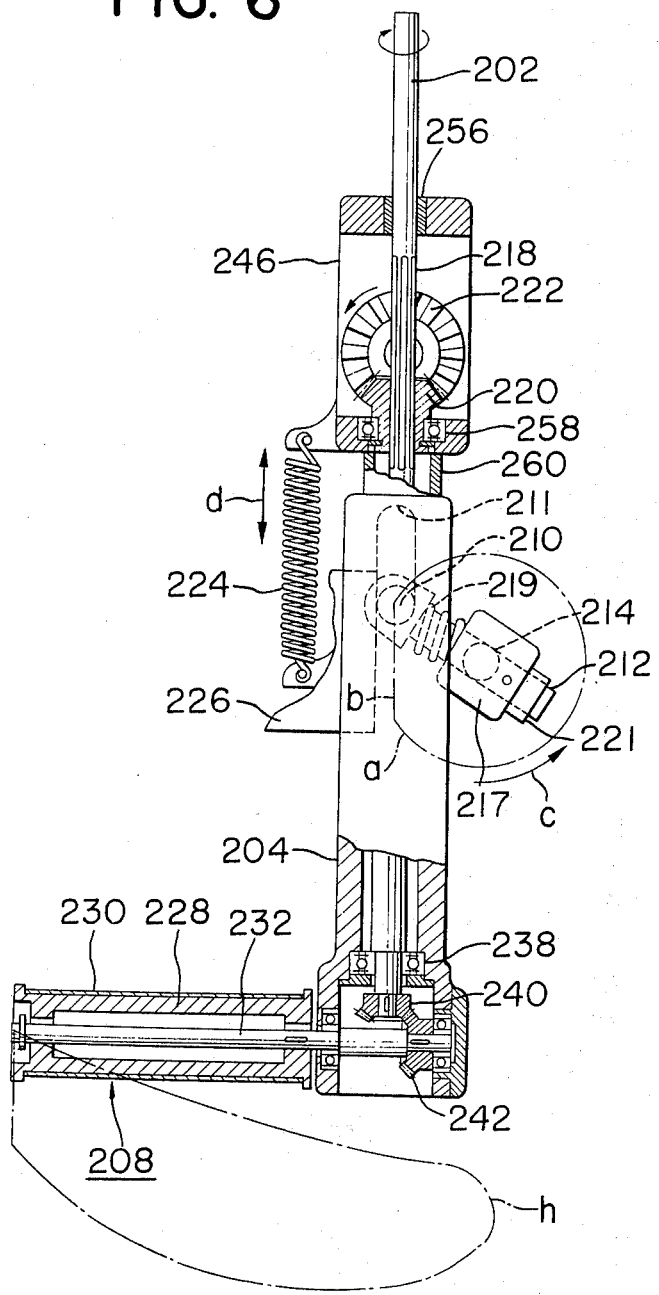
Figure 7:
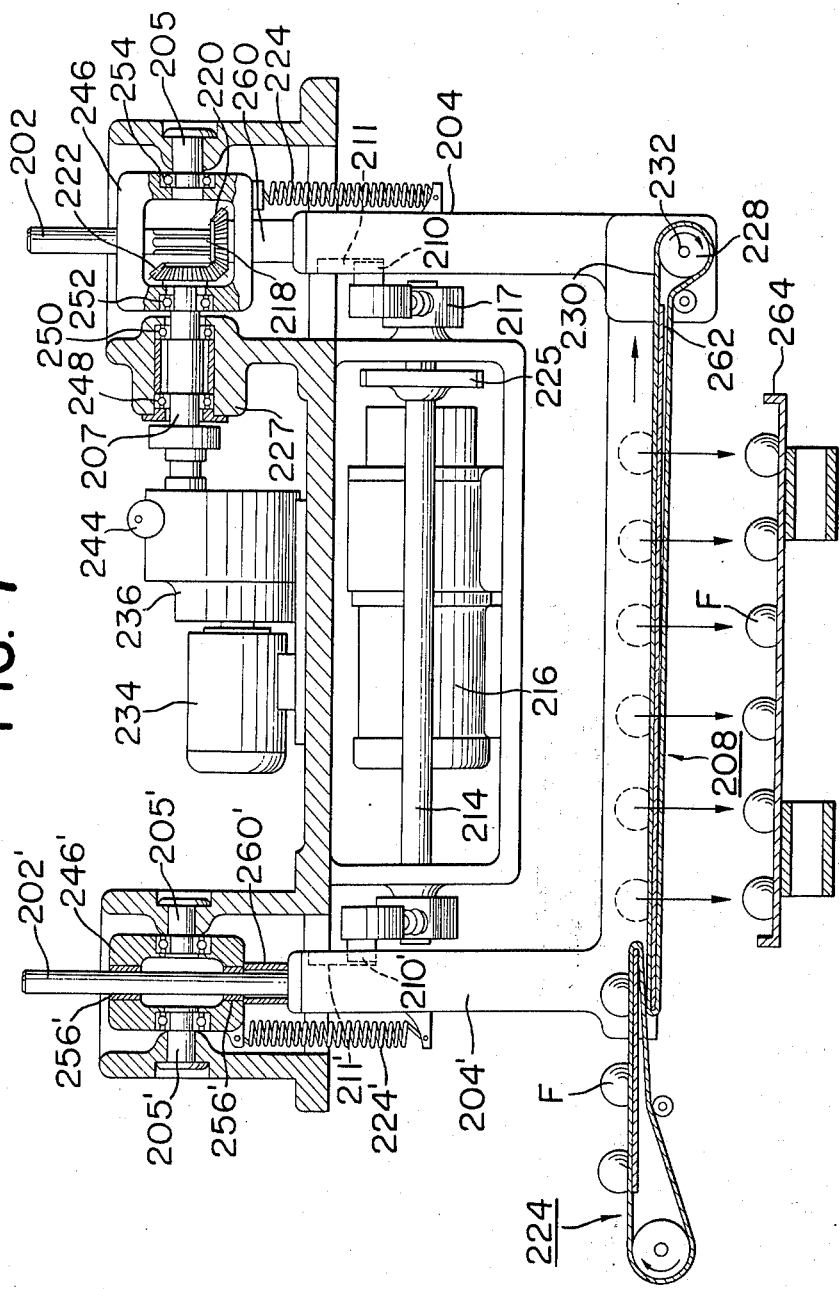
Figure 8:
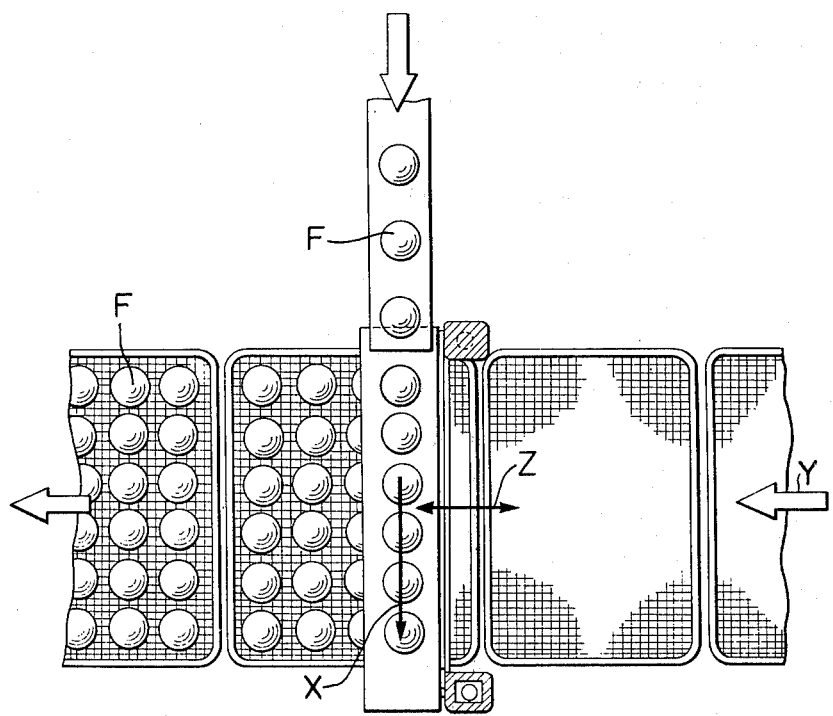

For a better understanding of the invention, reference will now be made by way of several examples to the accompanying drawings, in which:

FIG. 1 is a schematic side view of a prior transfer device,

FIG. 2 is a schematic side view of a first embodiment of a portion of a transfer apparatus in accordance with the present invention, FIG. 3 is a similar view to FIG. 2, but shows, partly in vertical cross-section, details of a power transmitting mechanism of the transfer apparatus, FIG. 4 is a schematic side view of a second embodiment of a portion of the transfer apparatus, FIG. 5 is a schematic side view of a third embodiment of a portion of the transfer apparatus, FIG. 6 is a detailed view of the embodiment illustrated in FIG. 5, partly in vertical cross-section, FIG. 7 is an elevational front view of the third embodiment of the transfer apparatus, FIG. 8 is a plan view of a portion of the apparatus in accordance with the present invention, illustrating a mode of transferring substantially spherical articles according to the present invention.

FIG. 1 shows a schematic side view of a prior transfer device. This is an example of a transfer device in which a transfer conveyor P is supported by a support shaft Q through an axially non-displaceable support cylinder R unlike the embodiments of the present invention.

In this case, the amount of the downward displacement of the transfer conveyor P in its locus of swing is, as indicated by ($e$), smaller than those of the loci of motion ($f$), ($g$) and ($h$) shown in FIGS. 2, 4 and 5.

One of the methods of increasing the distance of the downward movement is to encase a vertical rod 2 in a support cylinder 4 as in the embodiment of FIG. 2 or 3 thereby to make the distance between a fixed axis of rotation 6 and the transfer conveyor 8 freely variable. A crank pin 10 is provided parallel to said fixed axis 6 and is inserted in a circular hole of the support cylinder 4 at a desired portion thereof. A crank arm 12 is fixedly secured to the crank 10 at an end and to a crankshaft 14 at the opposite end. Of course, the crank pin 10 may be fixed on the support cylinder 4 and the crank arm 12 may be pivotably mounted on said crank pin 10. The crankshaft 14 is operatively connected to a motor 16 through gears 23 and 25 for rotating the crank arm 12 in the direction to lower the crank pin 10 after the predetermined number of articles F are fed onto the transfer conveyor 8. A spline 18 is formed on the vertical rod 2 and a further spline is formed on a bevel gear 20 which meshes with a bevel gear 22 whereby the vertical rod 22 is allowed to slide axially through the bevel gear 20 while it is capable of rotation about its axis together with the bevel gear 20.

The locus of swing of the transfer conveyor 8 may be as indicated by a closed curve ($f$) in FIG. 2 or 3. Though the lower portion of this locus is positioned lower than that of locus ($e$), the locus of the return movement of the transfer conveyor 8 will cross the original level ($s$) of the transfer conveyor 8 and will go beyond and above the level ($s$) at the portion indicated by ($r$).

A support cylinder 104 of FIG. 4 is different from the support cylinder 4 of FIG. 2 or 3 in that a crank pin 110 is fitted in a longitudinally elongated slot 11 formed on the support cylinder 104. A transfer apparatus of FIG. 4 comprises a spring means 124 for normally holding a transfer conveyor 108 at a position where the transfer conveyor 108 receives articles F.

According to such a mechanism as shown in FIG. 4, the elongated slot 111 will release partially the force of the crank pin 110 in a direction of thrust, so that the locus of the swinging motion of the transfer conveyor 108 may become as shown at (g), and thus the part (r) as shown in FIG. 2 or 3 will disappear.

In this regard, the embodiment of FIG. 4 is an improvement of that of FIG. 2 or 3, because during the return movement of the transfer conveyor 108 it can avoid collision with a feed conveyor (not shown in FIG. 2, 3 or 4, but will be understood on the analogy of a feed conveyor 224 of FIG. 7), which would be caused depending upon the structure of the apparatus, in such a case as where a feed conveyor closely overlaps the transfer conveyor.

In FIG. 5 or 6, a guide or cam plate 226 is further provided to adjust the configuration of the locus of a crank pin 210 to take the form of the combination of (a) and (b) so that the locus of the tip of a transfer conveyor 208 may be made to take the form illustrated by (h), which consists of a vertical descent, a lateral receding movement and a return movement which does not cross the level (s).

The mechanism of FIG. 4, where the structure does not include the cam plate 226, is per se advantageous over the prior art. However, when the cam plate is provided to forcibly produce the vertically downward movement, the structure is more effective.

The present invention is based on the discovery that, by quickly separating the support plate (the upper face of the transfer conveyor) from the formed articles F, the formed articles F will fall by gravity without changing their relative positions due to their inertia so that tumbling or rolling of the formed articles on the receiving container may be prevented. In this sense, the locus (h) further improves the effect of transfer of formed articles.

If the movement of the transfer conveyor is other than vertically downward, the formed articles F are more or less drawn laterally in the initial stage of the movement of the transfer conveyor due to friction between the articles and the support plate and this tends to cause tumbling of formed articles after transfer, even if the downward separation of the transfer conveyor is performed quickly.

Depending upon the physical properties of the articles, a complete separation of the transfer conveyor from the articles in their downward movement as illustrated in FIG. 5 or 6 would not succeed unless the transfer conveyor is made to move vertically downwardly at a speed higher than the falling speed of the formed articles. Thus, as the case may be, it is more advantageous to move the transfer conveyor at first vertically downwardly and then laterally than to move obliquely as in the embodiments of FIGS. 2, 3 and 4 when the speed of movement of the transfer conveyor is substantially equal.

In FIGS. 6 and 7, reference numeral 205 designates a support shaft fixedly mounted on a frame 227 of the present apparatus, and reference numeral 207 designates a rotary input shaft for a drive roller 228 which rotates to move the belt 230 of the transfer conveyor 208. The transfer conveyor 208 may be supported by the support cylinder 204 and a bracket connected to the support cylinder 204, and the drive roller 228 is fixed on a roller shaft 232 which is held by the support cylinder 204 at its lower part.

The rotation input system for the roller shaft 232 will be described hereinbelow.

The output of a motor 234 is transmitted through a rotation regulator 236 to the input shaft 207, and a bevel gear 222 which is secured to the end of the shaft 207, transmits the rotation to a bevel gear 220 meshing therewith. The bevel gear 220 engages a splined vertical rod 202 having several axial grooves 218 to transmit the rotation thereto. The manner of the engagement is such that the vertical rod 202 is fitted in the mating axial grooves formed in a throughhole provided centrally of the bevel gear 220 so that they engage each other when they are rotated in the radial direction, but are free from each other in case of the movement of the vertical rod 202 in the axial direction.

The vertical rod 202 is held within the support cylinder 204 through a lower bearing 238 and an upper bearing (not shown in FIGS. 6 and 7, but will be understood on the analogy of the embodiment of FIG. 3). The vertical rod has at its lower end a bevel gear 240 which is meshed with a bevel gear 242, which in turn is fixedly mounted on one end of the roller shaft 232 of the drive roller 228. Thus, it will be clearly understood that the rotation of the motor 234 is transmitted to the belt 230.

Reference numeral 244 designates a rotation adjusting handle. By manipulating the handle 244 the number of rotations per unit time of the drive roller 228 is changed through the above-described system to vary the speed of the belt 230. Thus, by manipulating the handle 244 intervals between formed articles F on the transfer conveyor 208 can be set at a desired pitch.

The bevel gear 220 is rotatably mounted on a swinging bracket 246. The bracket is supported by the support shaft 205 and the belt input shaft 207, which is rotatably mounted on the frame 227. Bearings 248 and 250 are inserted between the frame 227 and the belt input shaft, and bearings 252 and 254 are inserted between the bracket 246 and the shafts 207 and 205, respectively, to smoothen the swinging motion of the bracket 246. Of course, the shafts 205 and 207 have a common axis about which the bracket 246 is swingable. A slide metal 256 and a bearing 258 are inserted between the bracket 246 and the vertical rod 202, and the bevel gear 220, respectively. The slide metal 256 guides the rotation and the axial movement of the vertical rod 202, and the bearing 258 smoothens the rotation of the bevel gear 220.

Thus, it will be readily understood that the vertical rod 202 is movable in each of the radial and thrust directions.

The transfer conveyor 208 may often have a considerably long travelling distance when it is desired to transfer simultaneously a large number of formed articles. In such a case, it is practical that the transfer conveyor 208 is swung by at least two support cylinders 204 and 204' as provided adjacent to each of the opposite ends of the transfer conveyor 208, and at other places if required.

The structural difference between the support cylinders 204 and 204' is that the support cylinder 204 holds the drive roller 228 and contains its rotary input mechanism, whereas the support cylinder 204' does not hold any drive roller, nor does it contain any rotary input mechanism.

Reference numeral 202' designates a vertical rod, which corresponds to the splined rod 202 supported by the support cylinder 204, but does not transmit the rotary output of the motor 234. Therefore, the vertical rod 202' has no spline or axial grooves thereon unlike the splined vertical rod 202, and the swinging bracket 246' is supported by a pair of support shafts 205', 205' fixed on the frame 227 and has a pair of slide metals 256', 256' for guiding the vertical rod 202' so as to be movable in the direction of thrust. It should be noted that the shafts 205' have the same axis of rotation with those of the shafts 205 and 207.

Reference numerals 224 and 224' designate tension spring means for normally holding the transfer conveyor 208 at a position where it receives articles or pulling up the support cylinders 204 and 204' towards the swinging brackets 246 and 246', respectively. Spacer collars 260 and 260' are interposed between the support cylinders 204, 204' and the brackets 246, 246', respectively, to set the limit of the pull.

Crank pins 210 and 210' parallel to the shafts 205, 205' and 207 are adapted to slidably engage longitudinally elongated slots 211 and 211', respectively, which are formed in the side wall at a desired position of each of the support cylinders 204 and 204'.

Each of the crank pins 210 and 210' is rotated by a crankshaft 214. Each of the crank pins is mounted on the crankshaft in the following manner. The crank pin 210 is provided at an end of a crank arm 212 which is slidably inserted in a hole formed in a bracket 217 which is secured to the crank-shaft 214 at either end thereof. Between the bracket 217 and the crank pin 210 there is a compression spring 219 which biases the crank pin 210. The biasing action of the spring 219 is limited by a stepped part 221 provided at the outer end of the crank arm 212. When the bracket 217 and the stepped part 221 contact each other, that is, when the compression spring 219 pushes the crank pin 210 to the outermost point, the locus of rotation of the crank pin 210 is shown at (a) in FIG. 6. Reference character (c) indicates the direction of its rotation.

Reference numeral 226 shown in FIG. 6 designates a guide for restricting the downward movement of the crank pin 210 to be vertical over a desired length whereby to change the direction of locus of rotation (a) to a linear or almost linear locus (b) only when the crank pin 210 contacts the face of the guide 226. The crankshaft 214 is rotated by a motor 216. The motor 216 is adapted to be energized each time the predetermined number of the formed articles F are supplied onto the transfer conveyor 208, and to automatically stop upon completion of one rotation.

The arrow (d) indicates the distance by which the support cylinders 204 and 204' are drawn apart from the swinging brackets 246 and 246' by the crank pins 210 and 210' contacting the lower ends of the elongated slots 211 and 211', i.e. the extent of the expansion of the springs 224 and 224'. The distance corresponds to the vertical descent of the locus (h) of movement of the transfer conveyor 208.

Reference numeral 262 designates a support plate along the upper surface of which the belt 230 runs, the support plate extending laterally from the member connecting the lower parts of the support cylinders 204 and 204'

Reference numeral 224 designates a feed conveyor for feeding formed articles F onto the belt 230 of the transfer conveyor 208. Reference numeral 264 designates a receiving box for formed articles F.

FIG. 8 is a plan view illustrating the coordinated movements of the parts in the embodiments of the present invention. The arrow (x) indicates the travelling direction of the belt of the transfer conveyor, and the arrow (y) indicates the travelling direction of the receiving containers or other trays. The direction (z) of swing of the transfer conveyor is substantially perpendicular to the travelling direction (x) of the belt and substantially parallel to (y).

Various modifications and improvements can be made herein without departing from the scope of the invention as disclosed in the appended claims.

What I claim is:

1. A method of continuously transferring formed articles such as confectionery, bread or the like from a feed conveyor through a displaceable transfer conveyor onto a receiving conveyor, trays or boxes positioned beneath said transfer conveyor, characterized by transferring articles by causing said transfer conveyor to move substantially downwardly at a velocity greater than the falling speed by gravity of the articles thereon, and then swing substantially laterally at a velocity sufficient to avoid contacts with the falling articles thereby to cause the articles to fall onto the receiving conveyor, trays or boxes, and finally return to its original position to receive subsequent articles from the feed conveyor.

2. A method according to claim 1, characterized in that the downward motion of said transfer conveyor consists of a vertical descent.

3. An apparatus for transferring formed articles such as confectionery, bread or the like from a feed conveyor onto a receiving conveyor, trays or boxes, comprising a displaceable transfer belt conveyor, which receives articles from the feed conveyor and transfers them to the receiving conveyor, trays or boxes, characterized by a first means for driving the belt of said transfer conveyor for reception and positioning of said articles thereonto, and a second means for causing said transfer conveyor to move substantially downwardly and then swing substantially laterally with a changeable radius of rotation about a fixed axis parallel to the direction of movement of the belt of said transfer conveyor and positioned thereabove, and finally return to its original position.

4. An apparatus according to claim 3, characterized in that said first means comprises
 a drive roller engaging the belt of said transfer conveyor for driving said belt,
 at least one vertical rod operatively connected at its bottom portion to said drive roller perpendicularly thereto,
 a first motor, and
 a transmitting means for transmitting the driving force of said motor to said vertical rod thereby to rotate it about its own axis.

5. An apparatus according to claim 4, characterized in that said second means comprises
 at least one support cylinder which supports said transfer conveyor and said vertical rod so as to enable said vertical rod to rotate about its own axis,
 a pin parallel to said fixed axis and adapted to engage said support cylinder at a desired portion,
 a crank arm operably connected at one end to said pin and fixedly secured at the opposite end to a crankshaft,
 a second motor operatively connected to said crankshaft for rotating said crank arms in the direction to lower said pins after the predetermined number of articles are fed onto said transfer conveyor, and a spline formed on said vertical rod and said transmitting means thereby to allow said vertical rod to slide through said transmitting means.

6. An apparatus according to claim 4, characterized in that said second means comprises
at least one support cylinder which supports said transfer conveyor and said vertical rod so as to enable said vertical rod to rotate about its own axis,
a longitudinally elongated slot formed on said support cylinder at a desired position,
a pin parallel to said fixed axis adapted to engage said slot slidable,
a crank arm operably connected at an end to said pin and fixedly secured at the opposite end to a crankshaft,
a second motor for rotating said crank arm in the direction to lower said pin after the predetermined number of articles are fed onto said transfer conveyor, and
a spline formed on said vertical rod and said transmitting means thereby to allow said vertical rod to slide through said transmitting means,
said apparatus further comprising spring means for normally holding said transfer conveyor at a position where said transfer conveyor receives said articles.

7. An apparatus according to claim 6, characterized in that said crank arm is adapted to vary its length elastically,
said apparatus further comprising a guide for restricting the downward movement of said pins to be substantially vertical over a desired length.

* * * * *